(12) United States Patent
Maze et al.

(10) Patent No.: US 7,181,465 B2
(45) Date of Patent: Feb. 20, 2007

(54) SYSTEM AND METHOD FOR THE MANAGEMENT OF DISTRIBUTED PERSONALIZED INFORMATION

(76) Inventors: Gary Robin Maze, 5707 Spellman, Houston, TX (US) 77096; Dana Louis Schnitzer, 3934 University Blvd., Houston, TX (US) 77005

( * ) Notice: Subject to any disclaimer, the term of this patent is extended or adjusted under 35 U.S.C. 154(b) by 773 days.

(21) Appl. No.: 10/021,521

(22) Filed: Oct. 29, 2001

(65) Prior Publication Data

US 2003/0088581 A1 May 8, 2003

(51) Int. Cl.
*G06F 17/30* (2006.01)
(52) U.S. Cl. .................................... 707/104.1
(58) Field of Classification Search .............. 707/2, 707/5, 102, 1, 3, 104.1, 9, 10, 200; 379/220; 705/1; 709/224
See application file for complete search history.

(56) References Cited

U.S. PATENT DOCUMENTS 5,442,691 A * 8/1995 Price et al. ............ 379/220.01
6,442,526 B1 * 8/2002 Vance et al. ................... 705/5
6,526,399 B1 * 2/2003 Coulson et al. ................ 707/1
6,546,387 B1 * 4/2003 Triggs ........................... 707/1
6,571,239 B1 * 5/2003 Cole et al. ...................... 707/5
6,640,224 B1 * 10/2003 Chakrabarti .................... 707/5
6,728,696 B1 * 4/2004 Walton ........................... 707/2
2002/0165856 A1 * 11/2002 Gilfillan et al. ................ 707/3
2003/0131007 A1 * 7/2003 Schirmer et al. ........... 707/100

\* cited by examiner

*Primary Examiner*—Etienne P. LeRoux
(74) *Attorney, Agent, or Firm*—Duane Morris LLP (57) ABSTRACT

The present invention comprises a system useful for organization of information adapted for use in a computer system. In an exemplary embodiment, authorities and summarized information of an authority may be created for later access. Typically, raw data are captured into an authority table from which they can be selectively retrieved by a user. Users may also summarize at least a portion of the raw data; examine one or more elements in a user taxonomy table for an appropriate taxonomy element to associate with the summarization and/or authority and create a new element in the user taxonomy table for an appropriate taxonomy element to associate with the summarization or authority if an appropriate element is not already present in the taxonomy table. Users may further associate the summarization and/or authority with the appropriate element of the taxonomy table.

20 Claims, 6 Drawing Sheets

SYSTEM AND METHOD FOR THE MANAGEMENT OF DISTRIBUTED PERSONALIZED INFORMATION

BACKGROUND OF THE INVENTION

1. Field of the Invention

The present invention relates to the field of information management. More specifically, the present invention, in an exemplary embodiment, relates to a system and method of operation for personalization of categorization of information and summaries of larger documents.

2. Description of the Related Art

Knowledge base management tools are similar to datamining and search tools. Data mining focuses on so-called legacy data that is more transactional and financial in nature. For example, a massive database of sales figures can reveal trends or allow a user to "drill down" to specific territories, products, and customers. Search tools may ferret out information known to be possibly present, but do not necessarily reveal anything inherent in the data. Knowledge base management tools go a step further by enabling a user to collect and organize information, search for what the user needs, and share the user's findings with others.

In the art, most data provision services—i.e., search or data retrieval services—provide a set interface to their data. A user may only manipulate that interface in a manner dictated by the provider. For example, a user wishing to access services such as the LEXIS/NEXIS service which is provided by a division of Reed-Elsevier, Inc. or WESTLAW operated by the West Group may use software that resides at a user computer and that has access to data either resident on a CDROM, a hard drive local to the user computer's environment, or via a data communications network such as the Internet. Other users may access those services directly through the Internet. Many information sources do not provide a user level taxonomy at all, relying, if at all, on an Internet browser or other software to provide some user level utility to organize information, e.g. once data are accessed, storage of the data is limited by the browser or operating system to folders and searching within folders limited as well.

A problem that exists with these access methods is that the means and ability to categorize the data accessed is dictated by the provider. For example, WESTLAW uses its proprietary head notes taxonomy that WESTLAW alone maintains and creates. Educational services such as ERIC provide a rigid classification system.

For many users, these taxonomies are either inadequate because they are not tailorable to the user's specific needs or ignored because they represent a view of categorization with which the user is neither familiar nor inclined to learn or use. Moreover, given the level of current art searching methods, use of the provider supplied and imposed taxonomy is not as attractive for searching as it may have once been.

However, many users would benefit from an ability to categorize and organize data in a manner comfortable to that user, and perhaps to that user alone. Such capability will aid that user in accessing the data, extracting information relevant to that user from that data, and later retrieving that information rapidly and cost-effectively. A problem with such categorization is that such an ability may incur large support costs or be impracticably unwieldy.

As is known in the art, so called knowledge bases may comprise an indexed, searchable set of queries or frequently asked questions (FAQs) coupled with a search engine. Some methods proposed in the prior art deal with mining generalized sequential patterns from large databases of raw data, taking into account user specified constraints such as taxonomies. U.S. Pat. No. 5,742,811 issued to Agrawal, et al. for "METHOD AND SYSTEM FOR MINING GENERALIZED SEQUENTIAL PATTERNS IN A LARGE DATABASE" is illustrative.

The prior art also has much written on queries of databases. U.S. Pat. No. 5,826,260 issued to Byrd, Jr., et al. for "INFORMATION RETRIEVAL SYSTEM AND METHOD FOR DISPLAYING AND ORDERING INFORMATION BASED ON QUERY ELEMENT CONTRIBUTION" is illustrative and teaches an information retrieval system wherein a query issued by a user is analyzed by a query engine into query elements. After the query has been evaluated against the document collections, a resulting hit list is presented to the user, e.g., as a table. The presented hit list displays not only an overall rank of a document but also a contribution of each query element to the rank of the document. The user can reorder the hit list by prioritizing the contribution of individual query elements to override the overall rank and by assigning additional weight(s) to those contributions. However, the prior art has not adequately addressed using queries as a method of capturing, condensing, and presenting raw data or its summarization according to a user defined, user configurable taxonomy.

In addition, the prior art teaches methods of summarization of raw data. U.S. Pat. No. 5,918,240 issued to Kupiec, et al. for "AUTOMATIC METHOD OF EXTRACTING SUMMARIZATION USING FEATURE PROBABILITIES" is illustrative. Kupiec teaches a method of automatically generating document extracts that makes use of feature value probabilities generated from a statistical analysis of manually generated summaries to extract the same set of sentences an expert might. The method is based upon an iterative approach. However, Kupiec does not disclose and does not teach, suggest, or motivate towards use of a user tailorable taxonomy when doing its summarization or association of the generated summarization with one or more elements in the taxonomy.

Accordingly, there is a need for a user configurable interface comprising raw data, information summarized and derived from the raw data, and a user defined and maintained taxonomy to organize the information.

SUMMARY

The present inventions comprise a system for organization, location, and retrieval of information. In an embodiment, the system includes a server comprising a searchable authority table; a data communications device operatively in communication with the server; a user computer operatively in communication with the data communications device, the user computer having access to the searchable authority table; software executable in the server to provide access to and management of the authority table; and software executable in the user computer to provide access to and manipulation of the taxonomy table and the summary table. The user computer further comprises a user definable taxonomy table, wherein the taxonomy table is accessible to the user computer; and is manipulatable by a user with adequate access permission to manipulate the user taxonomy table. The user computer further comprises a searchable summary table that is accessible to the user computer, is related to the authority table and the user taxonomy table, and is manageable by a user with adequate access permission to manage the summary table.

The inventions further comprise methods of creating summarized information for later access for such a system as described above. In embodimebnts, raw data are captured into an programmatically manipulatable format; the programmatically manipulatable format of the raw data stored into the authority table; a description of a source of the raw data is captured and the description stored into the authority table while associating the description with the data in the authority table. The raw data may be retrieved from the authority table by a user and the user allowed to summarize at least a portion of the retrieved raw data, where the summarization is to be stored in the summary table. One or more elements in the user taxonomy table may be examined for an appropriate taxonomy table element to associate with the summarization and a new element created in the user taxonomy table describing an appropriate taxonomy element to associate with the summarization if an appropriate element is not already present in the taxonomy table. The summarization is associated with the appropriate element of the taxonomy table, and the summarization associated with the authority table. The summarization and associations are stored in the summary table.

BRIEF DESCRIPTION OF THE DRAWINGS

These and other features, aspects, and advantages of the present invention will become more fully apparent from the following description, appended claims, and accompanying drawings in which:

DETAILED DESCRIPTION OF THE PREFERRED EMBODIMENT

In general, throughout this description, if an item is described as implemented in software, it can equally well be implemented as hardware. Further, although numerous examples herein are described in terms of legal research, the present inventions are not limited by these exemplary embodiments but instead are limited only by claims.

Figure 1:
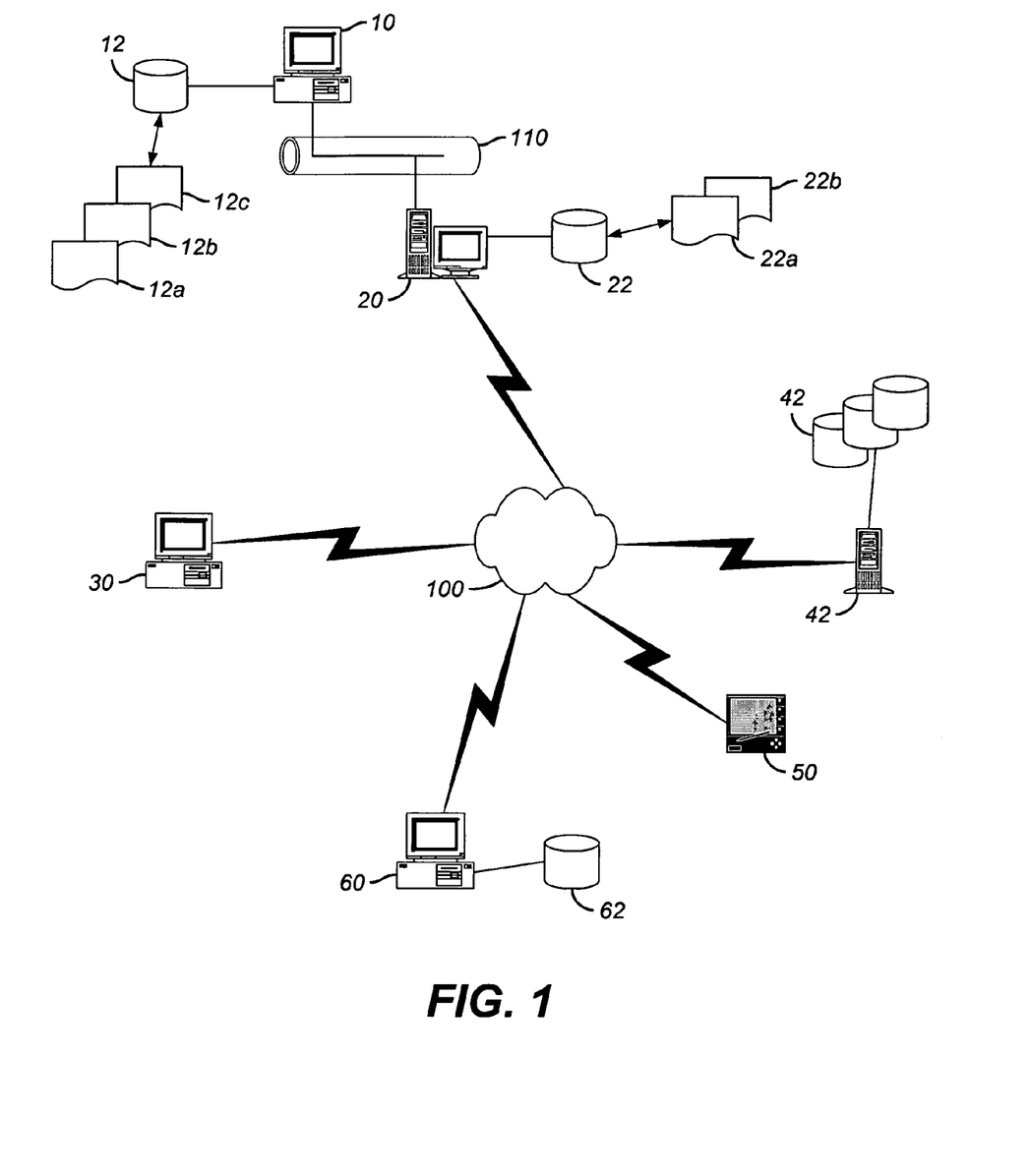
FIG. 1 is a schematic view of an exemplary embodiment of the system of the present inventions.

Referring now to FIG. 1, the system and method of the present invention are scalable, as that term is understood by those of ordinary skill in the database arts. Database 22 may reside solely at server 20 or be distributed among the various computers 10,20,30,40. A first portion 200 (shown in FIG. 2) of database 22 may comprise captured raw data, referred to herein as "authority" data, where these raw data are typically captured into authority table 22a, and a second portion 300 (shown in FIG. 2) of database 22 may comprise user manipulatable data, referred to herein as "summary" data, typically in summary table 12b associated with computer 10. As will be appreciated by those of ordinary skill in the computer arts, database 22 may comprise a single database such as database 22 at server 20 or be distributed to include database 12 at computer 10.

As will be appreciated by those of ordinary skill in the computer arts, general data may be thought of as "raw data," unprocessed and/or not reduced into a condensed form. Raw data that are condensed and/or organized according to some schema may be thought of as "information," able to be understood and acted upon. By way of example and not limitation, a legal decision issued in written form by a court may contain hundreds of words, some of which describe the background of the issues before that court, some of which synopsize prior case or statutory law which may apply to the facts of the case, and some of which define and discuss the holding of the court on the issues before that court. In this example, all the words of the written decision may be thought of as "raw data" but the two or three sentences within the decision that define the holding of the court on an issue may be what a user wishes to know and use, i.e. the "information" of the decision for that user.

By way of further example, text documents and webpages may also be raw data as may blueprints, wiring diagrams, or the like useful in building projects or maintenance and troubleshooting operations.

In many situations, the same raw data may be "mined" or synopsized by different users for different information. By way of further example and not limitation, a report of weather trends may be considered "raw data." A first user may view the raw weather data for temperature trends important to a building industry. A second user may view the raw weather data for rainfall trends important to a farming industry. Each user therefore uses the same raw data to mine different information.

Figure 2:
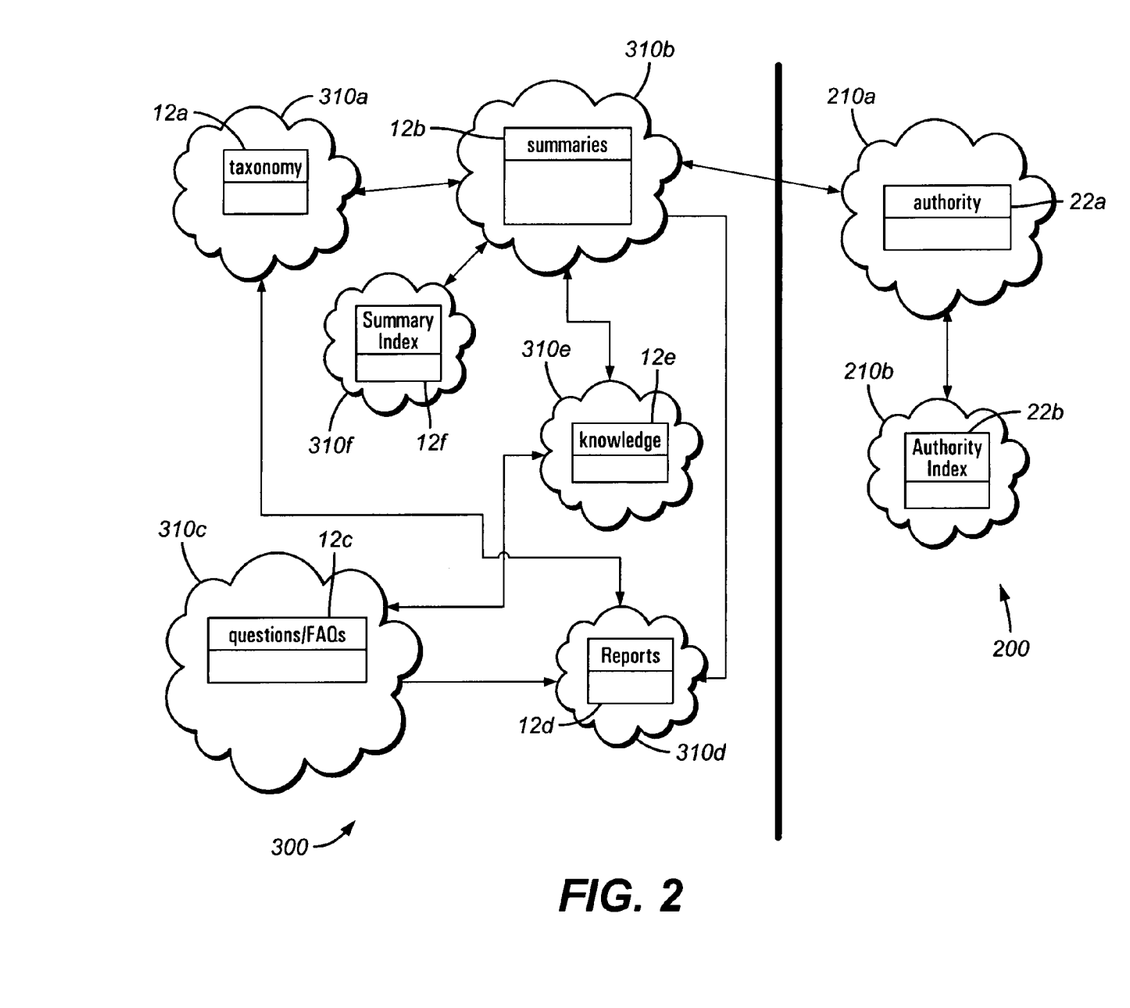
FIG. 2 is a schematic object-like view of organization of table elements of an exemplary embodiment of the system of the present inventions.

As used herein, "authority" is understood to mean any source of information and may comprise at least one of text data, graphics data, audio data, video data, and the like, or combinations thereof. Authority data may comprise documents such as documents, images, and the like. Authority data may further comprise references to the actual data, such as a URL or other file link. In an exemplary legal application, the documents may further comprise case law files, statutes, and court rules. Accordingly, by way of example and not limitation, authority table 22a may comprise at least one of legal data, medical data, educational data, manufacturing data, scientific data, and/or entertainment data. In a preferred embodiment, the actual raw data are captured for inclusion in authority table 22a such as in a memo field as will be familiar to those of ordinary skill in so-called x-Base database software. However, a pointer or other reference may be captured instead or in combination, such as a file location on server 20 or an Internet URL reference.

In the preferred embodiment, each entry in each authority table 22a, described herein as an "authority," will have a unique identifier such as a primary key value. Further, in a preferred embodiment, each authority may be identified by one or more keywords that may reside in an authority keywords table 22b associated with backend portion 200 (shown in FIG. 2). Authority keywords table 22b may be accessed using table software object 220b (shown in FIG. 2). Each element of authority keywords table 22b has a link back to authority table 22a from which that keyword was derived and may further comprise so-called pinpoint descriptors to identify the precise location in the authority associated with or resident in authority table 22a from which the keyword was derived.

By way of example and not limitation, a text file is captured into authority table 22a and may be parsed according to any of a number of equivalent methods to tokenize or otherwise summarize the text file. Each token or summary identifier identified may be captured into an element in an associated authority keyword table 22b where the element in that table 22b for that token comprises a word offset from a given, known starting point, e.g. the beginning of the text document, where that token exists. By way of further example and not limitation, a user may arbitrarily associate one or more authority keywords with a file captured into or identified in an authority table 22a, such as a geographic location in a graphic file or a time sequence identifier for audio or audiovisual data. Additionally, in some currently envisioned alternative embodiments, authorities may be translated into a different language upon or after capture. Additionally still, the translation may occur on the fly using any one of numerous equivalent methods or software as will be familiar to those of ordinary skill in the software arts and translations may be kept in authority table 22a and linked to each other to facilitate use.

Accordingly, as discussed below, second portion 300 (shown in FIG. 2) of database 22 comprises user tailorable tables. These tables comprise information and configuration data relevant to that user. In some instances the user tailorable tables may be shared between users, and in other instances the user tailorable tables may be distinct and not shared. By way of further example and not limitation, mechanics diagnosing engine problems for automobiles may wish to have access to the repair manuals for those automobiles as will those who repair air conditioner systems for those automobiles, although each of them will usually be interested in different subsets of the data contained in those repair manuals.

Although database 22 and its first portion 200 and second portion 300 (both shown in FIG. 2) may be two or more databases, as that term is understood by those of ordinary skill in the database arts, in this document database 22, including its first portion 200 and its second portion 300, will be referred to as a single database. In an exemplary embodiment where the user and backend portions of the database co-reside, database 22 may be a single database. Further, in some currently envisioned embodiments, authority data may be raw data and not resident in a table. By way of example and not limitation, in an embodiment where the present invention is configured at least partially as an Internet browser with some portion of the authority data being accessible via the Internet such as via HTML or XML web pages using numerous means including Internet search engines.

All of the software (not shown in FIG. 1) as well as database 22 may reside at a single computer, e.g. database 62 at computer 60 resident on a hard drive or optical storage device. Further, personal digital assistant 50 may have database 22 such as a solid state memory device insertable into and useable by personal digital assistant 50.

In an alternative embodiment, a user or client portion of the software may reside at user computer 10, laptop 30, or personal digital assistant 50 with a backend portion remaining at server 20. In this scenario, user computer 10, laptop 30, or personal digital assistant 50 may communicate with server 20 via wired or wireless networks such as local area network 110 and/or via the Internet 100. In a similar manner, a portion of database 22 may be present remotely from server 20 such as database 12 or database 42. These other databases 12,42 may be separate from database 22 and may remain independent from or linked to database 22 by methods that will be familiar to those of ordinary skill in the database arts.

A backend software component (not shown in FIG. 1) may be present to handle access to database 22. Additionally, in its various embodiments, a user/client portion of the software (not shown in FIG. 1) may be present to provide an interface to database 22 that remains constant with access remaining transparent to the user. In a currently preferred embodiment, access to database 22 may be accomplished by using object oriented programming techniques in which data access is encapsulated in table software objects (generally referred to as "210" and "310" in FIG. 2) with a user front end programmed in C++ or HTML or the like. Each table software object, e.g. 12a, 22a, may therefore be abstracted at the user front end. These table software objects may handle accessing tables locally, via a local area network, via a wide area network, or a combination thereof, and use protocols such as data access objects (DAO), Universal Data Access (UDA), Remote Data Objects (RDO), ActiveX Data Objects (ADO), direct access, DCOM, ODBC, SQL, or the like, or a combination thereof, without having to change the user front end. Such abstraction, as will be familiar to those of ordinary skill in the software programming arts, allows the present inventions to have an inherent scalability, as these terms will be familiar to those of ordinary skill in the software arts.

As will be discussed herein below, the user interface allows a user to tailor various aspects of the user/client portion of the system to that user's desires and needs. In an embodiment, the inherent scalability of the present inventions will allow use of a browser or browser-like user front end exploiting HTML pages for menus and providing other user functions while using table software objects to access database 22 and backend functionality. Accordingly, in addition to the various functions described herein, back-end portion 200 (shown in FIG. 2) of the present inventions may be configured to allow the Internet to act as a portion of authority table 22a. Searches may therefore be accomplished using the search functions of the present inventions coupled with search facilities present via the Internet. Summaries may be generated from the Internet sources and stored locally according to the user's taxonomy.

Further, the system may be used to provide selected users with access to one or more functions via the Internet. Using HTML, a user may sign in through an HTML user interface. In a currently preferred embodiment, the HTML user interface receives a temporary "cookie" from server 30 which is good only for the current session and is destroyed or otherwise deactivated when the current session ends or a predetermined inactivity timeout has occurred. Additionally, the sign-in process may require that the user first read and acknowledge a disclaimer similar to an end user license agreement. If the user rejects the disclaimer, a "cookie" will not be issued and, without the cookie, the user will be denied access to the system.

Once access to the system has been granted, the user may be allowed access to predetermined system functionality such as to the frequently asked questions or in user question/ FAQ table 12c. Should the user wish to access additional functionality, e.g. fee-based functions, the user may then be presented with a request for payment such as with a form requesting payment via credit card (not shown in the figures). Once payment has been verified, the user may be issued an access code and password which will allow access to predetermined fee-based sections of the system. This access code and password may additionally be required for future access to the fee-based sections of the system. However, direct access to predetermined functionality may be disallowed until a user first accesses the system in the normal manner and acknowledges a disclaimer.

In some currently envisioned embodiments, user anonymity is essential and may be assured by the use of one or more third party companies, such as those that handle credit card verification and subsequent funds transfer. In order to maintain anonymity, users to the additional functions may be assigned a discreet code such as an alphanumeric password code which shall be used as an identifier to track their queries and subsequent system responses. All communications between the system and these users may then occur through the user interface using this password code as the primary contact identifier. In certain embodiments, the password code may only be valid for the then current session, helping assure that no direct contact occurs between the a user and the system operators.

Additionally, the present inventions may be accessible with or through additional software, by way of example and not limitation including operating systems, such as by a user or programmatically invocable service or a shortcut-key service, e.g. ALT-K; application systems, such as word processors, work flow processors, project planners, case mangers; and the like, or combinations thereof. Such embodiments may allow a user of another software application such as a word processor to utilize that other application while conducting searches and constructing documents or gathering other data from the system of the present inventions.

As discussed above, in an alternative embodiment, the present inventions may be used in conjunction with a service that maintains authority table 22a. Server 30 is accessible to a user such as a laptop 30 or personal digital assistant 50 having appropriate access. As each such user researches or otherwise captures new authorities, server 30 may maintain either the authority raw data or a link to the authority raw data according to the teachings of the present inventions. If server 30 is accessible via the Internet 100, server 30 may be made available to a plurality of users on a general or selective basis, such as an open or free service, a for-fee service, a service limited to a community of users, and the like, or combinations thereof. Thus, research by one user, e.g. laptop 30, can inure to the benefit of all users, e.g. computer 10 and personal digital assistant 50, because authority table 22a grows with each user's additions and each authority so added may be made available such as via searches to all users. Although each user 30,50 may be allowed their own customized view of the authority data, e.g. their separate taxonomy tables 12a, all share the same source, i.e. authority table 22a.

Referring now to FIG. 2, in the currently preferred embodiment, database 22 may comprise two major sections, 200 and 300. As will be familiar to those of ordinary skill in the database arts, a database in general may comprise tables and possibly other components such as views and reports. In this exemplary embodiment, backend portion 200 of database 22 comprises at least one authority table 22a, where authority table 22a may be accessible via table software object 210a, and user portion 300 comprises at least one summary table 12b, where summary table 12b may be accessible via table software object 310a. Both these tables may be free tables, associated with the same database such as database 22, or associated with different databases. However, in an exemplary embodiment where the user and backend functions co-reside in a computer, all tables may be associated with a single database such as database 22.

User portion 300 of database 22 comprises at least one user tailorable summary table 12b that may be accessible via table software object 310b and may comprise other user tailorable tables. In additional exemplary embodiments, one or more of these tables may be related to other entities, by way of example and not limitation including clients, client matters, resources, and the like, such as for use in billing, case management, work flow management, project planner, and the like, or combinations thereof.

User taxonomy table 12a may be part of user portion 300 and contains user defined categorizations as well as relationships between each member of taxonomy table 12a to others in taxonomy table 12a. In a currently preferred embodiment, user taxonomy table 12a is organized as a linked list where each taxonomy element, sometimes referred to herein as a "category," has a parent link value. However, individual elements of taxonomy 12a or entire groups of elements, e.g. branches of a hierarchically organized taxonomy table 12a, may be associated with or related to one or more other members or groups of taxonomy 12a as described more fully herein below.

User summary table 12b may be part of user portion 300 and contains an element for each item of information the user desires to link to at least one element in user taxonomy table 12a. In the currently preferred embodiment, each element in user summary table 12b, sometimes referred to herein as a "summary," must be linked to at least one element in user taxonomy 12a as well as to a single element in authority table 22a in backend portion 200. User summary table index 12f is associated with user summary table 12b in part to aid in searching functions. One currently envisioned method of relating user summary table 12b to authority table 22a is to use an intermediate table such as user knowledge table 12e which relates one element in authority table 22a to one element in user summary table 12b, although one-to-many relationships may be defined in this or other manners as well.

In an embodiment, user question/FAQ table 12c may exist in user portion 300. User question/FAQ table 12c may be used to contain organizational help queries or other user tailored condensations of data, e.g. serve as a container for a plurality of elements in user summary table 12b. Each element in user question/FAQ table 12c may be related to one or more entries in user knowledge table 12e. User knowledge table 12e, in turn, may be related to a plurality of elements in user summary table 12b. In alternatively contemplated embodiments, user question/FAQ table 12c and user knowledge table 12e may be combined into a single table. Use of separate tables allows a single element of user question/FAQ table 12c to have several elements in user knowledge table 12e related to that element in user question/FAQ table 12c, allowing a one-to-many relationship.

In a further aspect of the present inventions, user question/FAQ table 12c may be reproduced as a report on a taxonomy element basis, e.g. with report table 12d. In this manner, summaries captured such as in user summary table 12b may be used in conjunction with user question/FAQ table 12c and taxonomy table 12a to create a user-based cylopedia or reference work.

Because user portion 300 may be separate from backend portion 200, a single backend authority table 22a may be shared concurrently by numerous users, as will be familiar to those of ordinary skill in the database arts. Additionally, backend authority table 22a may reside at some distance remote from the user. In such an environment, user portion 300 software may communicate with backend portion 200 services, such as via wireless or wired networks such as local area network 110 (FIG. 1) or the Internet 100 (FIG. 1). Linkage between backend portion 200 and user portion 300 may be by a unique key identifier such as to a unique authority table key value. Additionally, messaging between backend portion 200 and the user portion 300 may comprise short messages, easing communications bandwidth requirements.

In a currently envisioned embodiment, access to the system may be through numerous means, by way of example and not limitation including programs written for a specific database such as MICROSOFT VISUAL FOXPRO, general languages such as C++ or C# that may also include an SQL or ODBC or equivalent interface ability, an HTML (hypertext markup language) or the like graphical interface, JAVA, or the like, or combinations thereof. The user interface may thus be presented using an Internet browser or the like and may include access through the Internet. Additionally, one or more system functions may be executed from a persistent data storage device such as a hard disk, diskette, CDROM, e-prom, solid state device, or any other digital medium which can contain executable code and/or one or more portions of database 22.

Figure 3:
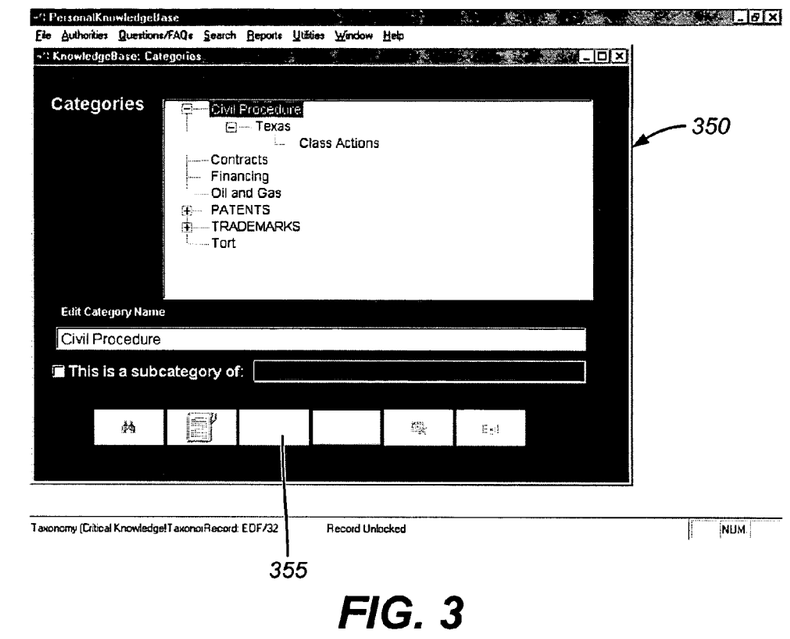
FIG. 3 is an exemplary taxonomy screen form.

Referring now to FIG. 3, in a preferred embodiment, logic in forms (such as from 350 shown in FIG. 3) used for presentation of data to the user may be decoupled from data access logic by use of table software objects such as 210, 310 to allow adapting a resource being accessed so that the type of resource can change easily and independently.

The user may acquire or otherwise access raw data for storage in authority table 22*a* (FIG. 1) which may reside at a backend server such as server 30 (FIG. 1). By way of example and not limitation, the user may copy these files from another source such as through the Internet 100 (FIG. 1) or directly enter the authority information into authority table 22*a*. In an exemplary embodiment, raw data may be input into authority table 22*a* by selecting an option, in FIG. 3 shown as button 355 with a label of FULL TEXT, which then allows the user to copy the data or link into authority table 22*a*.

Additionally, users may be allowed to switch between databases 22 as well. When a user switches, the context of the user's summaries and taxonomies may switch as well. However, a user may link taxonomy table 12*a* to multiple authority tables 22*a*, as well as multiple tables in user portion 300. In situations where a user computer has access to multiple databases 22, if the user deletes a taxonomy level in such a multiple context the deleted item may remain present in taxonomy table 12*a* but would be disabled, e.g. grayed out, for the set of tables associated with the context in which the user deleted the item from taxonomy table 12*a*. If the item from taxonomy table 12*a* is associated with no further tables, that item may then be removed from the shared taxonomy table 12*a*.

Figure 4:
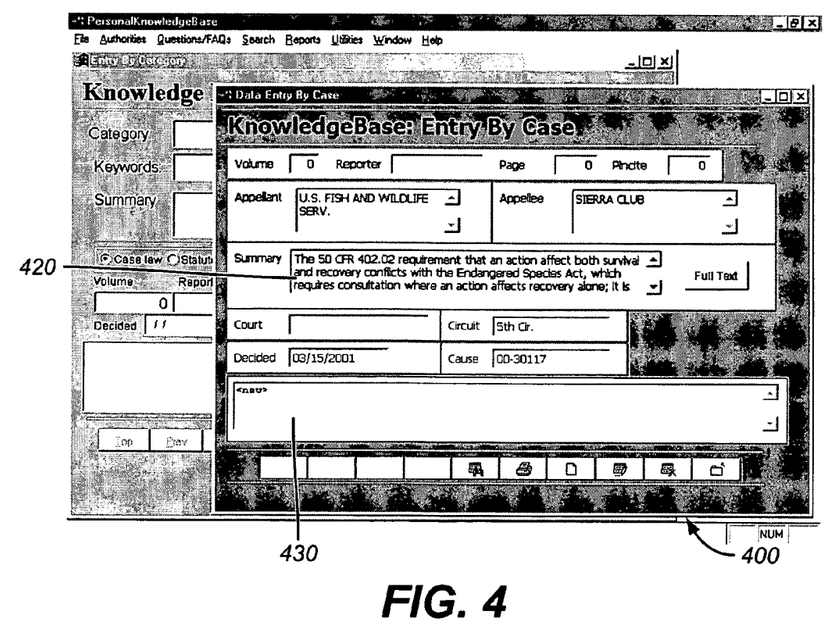
FIG. 4 is an exemplary data entry screen showing entry by authority for a legal system.

Referring now to FIG. 4, once raw data are entered into or accessed from authority table 22*a*, a user may generate one or more summaries for each element of authority table 22*a* in numerous equivalent ways as will be familiar to those of ordinary skill in the programming arts. However, a user may invoke an entry screen such as shown at 400 and use that screen to capture or access an authority which has not yet been captured. If the authority is not yet present in authority table 22*a*, capturing the authority in this manner will, upon acceptance by the user such as with a button, capture that authority or its link into authority table 22*a*.

By way of example and not limitation, the user may retrieve the previously entered element from authority table 12*a*, view the raw data associated with that element, highlight or mark a section of the raw data to be captured, and signal a desire to capture the highlighted or marked section as a summary. This may be accomplished, by way of example and not limitation, by using a mouse to highlight the section and then using a right-button click of the mouse to bring up a menu that has an entry to allow capture. In this manner, for example, a capture function could additionally capture the reference parameters such as word offset information for captured text data. The user may additionally associate the captured summary with one or more elements in taxonomy table 12*a*. Optionally, the user may create new elements in user taxonomy table 12*a* for use with the summary. The user may additionally edit the summary data captured and/or replace or augment all or a portion of the summary with whatever the user wishes, by way of example and not limitation including audio augmentation, video augmentation, and the like.

Summary information may be shown such as at 420 and taxonomy elements associated with that summary for the authority may additionally be shown such as at 430. As shown in FIG. 4, an exemplary legal system form, additional information for the authority as well as the summary and taxonomy associations may be manipulated.

Accordingly, the user can synopsize or summarize the raw data into information relevant to that user. In an additionally envisioned embodiment, an automatic summary option may be present to synopsize or suggest a synopsis of an authority or a portion of an authority. Further, a user may use form 400 to search for authorities and their summaries.

Figure 5:
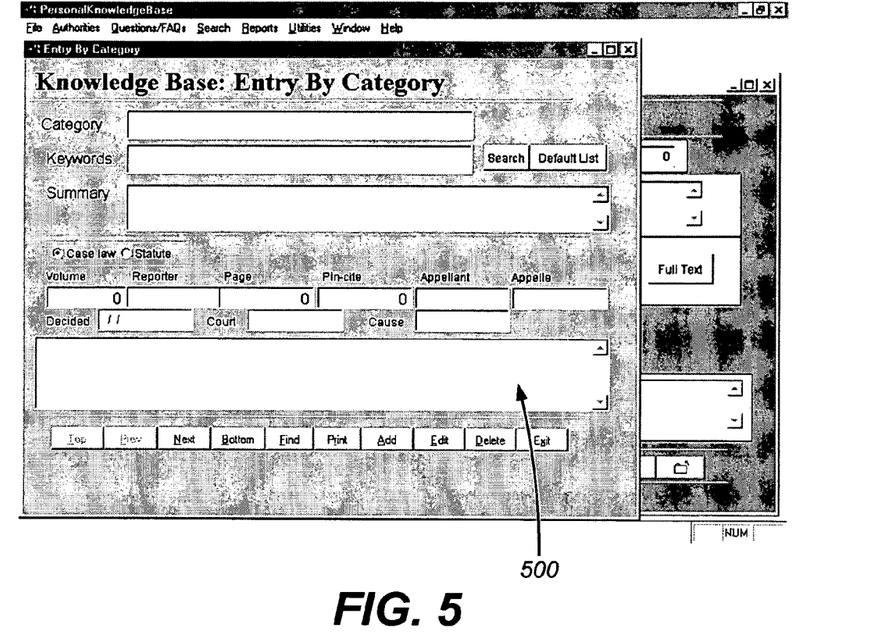
FIG. 5 is an exemplary data entry screen showing entry by taxonomy element for a legal system.

Referring now to FIG. 5, the user may additionally search for and/or enter summary and/or authority data on a taxonomy element basis. As with FIG. 4, data so captured may be manipulated by the user.

Figure 6:
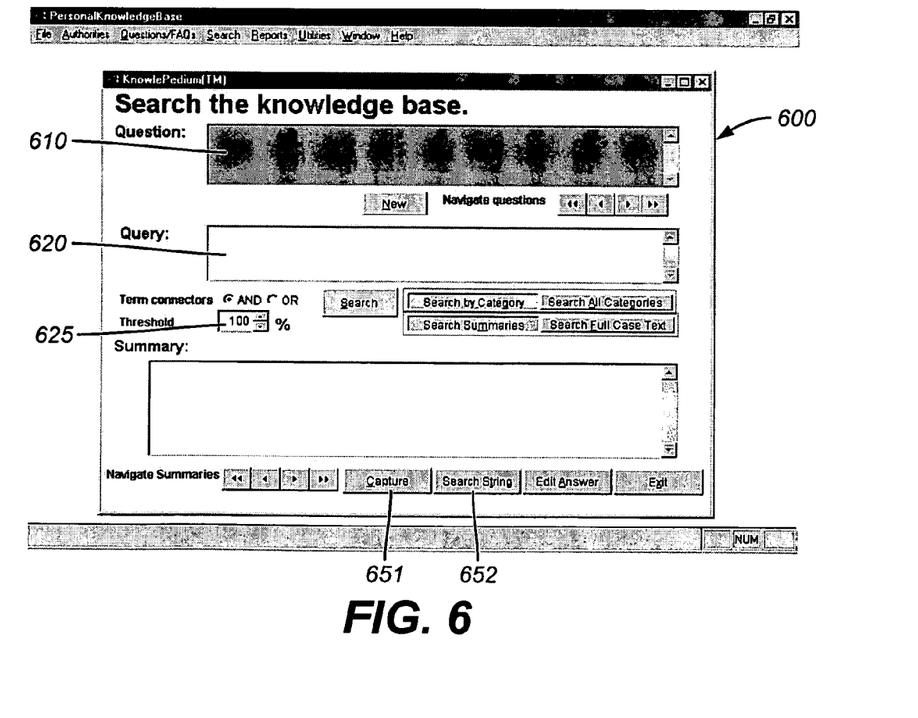
FIG. 6 is an exemplary screen showing a form useful for searching of the summaries and authorities.

Referring now to FIG. 6, when a user desires to retrieve information, the user may search for information in numerous ways. By way of example and not limitation, the user may elect to see all summaries the user has created and associated with one or more selected elements in taxonomy table 12*a* (FIG. 2), to search the user created summaries in summary table 12*b* (FIG. 2) for all instances of one or more keywords, or a combination thereof. The user may additionally elect to search authority table 22*a* (FIG. 2) by keyword, including limiting searches to one or more parameters as will be familiar to those of ordinary skill in the database arts.

In all search situations, keywords that are generated may be displayed such as at 620 or via button 652 for a user and modified or deleted, and additional keywords entered, by users with appropriate permission. In a further embodiment, the user may elect to designate how the keywords are to be viewed for a search to produce a result. As will be familiar to those of ordinary skill in the programming arts, the user query may designate certain words as required, such as by using a "+" symbol, and words to be omitted, such as by using a "−" symbol. Additionally, the user may use proximity search designators including "within sentence," "within paragraph," and/or "within 'n' words of 'phrase'" designators. In advanced searches, a user may further be able to designate additional search conditions for one or more fields present in authority table 22*a*, e.g. dates, authors, type of authority, and the like.

In an embodiment, the user may also set a threshold value for searches such as at 622 whereby a query containing a plurality of keywords for the search requires an authority or summary to possess at least that threshold of keyword occurrences to be considered a positive or relevant result. By way of example and not limitation, a user query may contain four keywords and have a threshold of fifty percent. Any summary or authority, depending on the search requested, that has at least two of the four keywords is then presented to the user as a positive or relevant search result. Others, e.g. with only one keyword, are not presented.

In an exemplary embodiment, keywords for authority table 22a, summary table 12b, user question/FAQ table 12c, or combinations thereof may be generated automatically or configurably. By way of example and not limitation, when new raw data are added to authority table 22a, the raw data may be parsed, keywords generated, and keywords entered into authority keyword table 22b. Additionally, when a summary element or question/FAQ element is created or modified, its associated text may be parsed and keywords may be added to or replaced in the appropriate keywords table such as 12f. Noise words may be configurably excluded from the keywords tables, e.g. common words such as "this," "that," "with," "of," "the," and "a."

Additionally, when new raw data are added to authority table 22a (FIG. 2) or when new elements are added into user question/FAQ table 12c (FIG. 2), the generated keywords may be used to suggest one or more taxonomy categorizations to the user. By way of example and not limitation, software executing at user computer 10,30,50 (FIG. 1) may receive notice that a new entry has been added to authority table 22a (FIG. 2). That software may gather the keywords associated with the new element of authority table 22a (FIG. 2) and then, using the user's taxonomy table 12a (FIG. 2), gather keywords associated by the user with that user taxonomy table 12a (FIG. 2) such as on an element by element basis. For each element in the taxonomy, the software can determine if those keywords are also present in the new authority's entry at or above a predetermined, configurable threshold. If so, the software can suggest that the newly entered authority is appropriate for the user with respect to that taxonomy category and additionally allow the user to view the authority and create new summaries.

When a query uncovers no results meeting the search criteria, a user may invoke an Internet browser or other communications interface, either native to the system such as in a window or external to the system such as a second application, and access other sources of authority data. If data are found in the new source, the data may be captured into authority table 22a (FIG. 2) in accordance with the teachings of these inventions. Additionally, a user may optionally capture merely the reference to the data, e.g. a URL.

In some embodiments, a natural language query section may be present, e.g. at 610. In other currently contemplated embodiments, question area 610 may be linked to user question/FAQ table 12c (FIG. 2). In such embodiments, users who may not have access to the system of the present invention may submit questions and users with access may review each question submitted and select from the summaries uncovered those which the querying user thinks relevant to the question asked. These relevant entries may then be associated with the user question, such as with button 651. By way of example and not limitation, a non-querying user may submit a question to be researched such as via e-mail and a querying user research the question and provide an answer back to the non-querying user.

Figure 7:
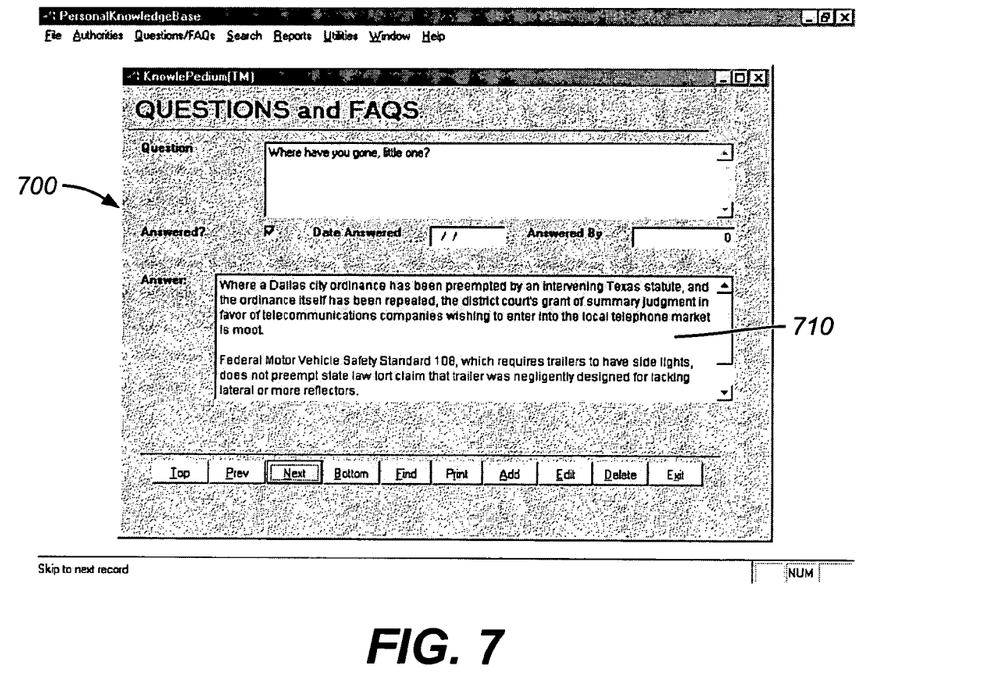
FIG. 7 is an exemplary screen showing a form useful for entry and searching of questions and FAQs.

Referring now to FIG. 7, in an additionally contemplated embodiment, a further exemplary form is shown at 700 to allow further manipulation of questions and their answers such as those captured into user question/FAQ table 12c. The answer to the question may be edited by a user with appropriate access permission such as in answer box 710.

By way of further example and not limitation, when viewing the search results that used summary table 12b as the source of the search, in an exemplary embodiment the user may select the summary created such as with the form in FIG. 6 such as by double-clicking the mouse on the summary or selecting an appropriate command button or other equivalent method and be presented with the raw data from which the summary was derived. Such selection may invoke an editor to allow the user to redact the selected summaries into a more specific, targeted, and/or otherwise tailored response to the question posed.

In an further currently envisioned alternate embodiment, Internet browser functionality may be accessible from a user perspective to present the interface such as discussed above in FIG. 3 through FIG. 7. By way of example and not limitation, a user selectable option may be present to invoke one or more functions from within a browser. In additionally contemplated embodiments, one or more functions of the user front-end may be integratable into an Internet browser as plug-in. By way of example and not limitation, using HTML, a user interface may provide a "front end" through which a user accesses the system, e.g. accesses its databases and/or communicates with the system operators. In certain embodiments, the user interface may be the only conduit between the user and the system.

Figure 8:
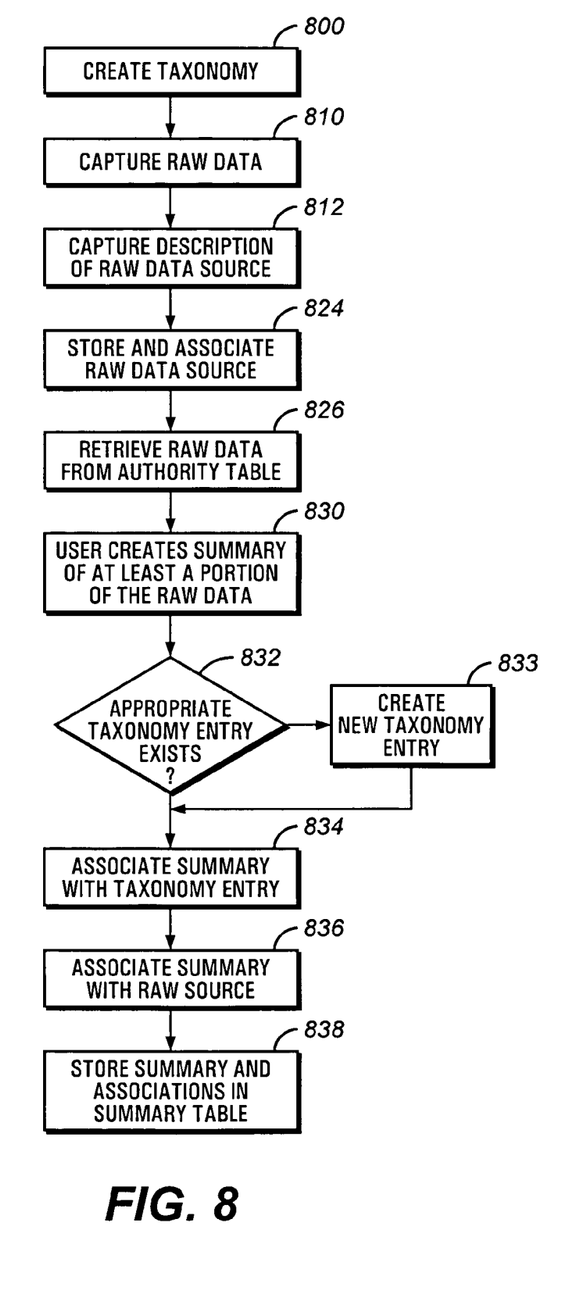
FIGS. 8 and 9 are flowcharts of an exemplary embodiment of the system of the present inventions.

In the operation of an exemplary embodiment, referring now to FIG. 8, a user creates a taxonomy to the user's liking at step 800. The user taxonomy is stored in user taxonomy table 12a. The taxonomy is free-form, and as shown in FIG. 3, in the currently preferred embodiment may be organized and presented as a linked list presenting a tree structure as will be familiar to those who use Microsoft WINDOWS® software such as the file manager interface. In other currently envisioned embodiments, user taxonomy table 12a may be organized in any manner that allows multiple levels of associations between an element and other elements in that table 12a and may be presented to the user in numerous ways as will be familiar to those of ordinary skill in the computer arts, by way of example and not limitation including as folders and trees.

Category elements in taxonomy table 12a are left up to a user with adequate permission to create, modify, or delete those members and can therefore reflect the categorizations and associations desired by a user individually. Although user taxonomy tables 12a may be shared among groups of users, each user can possess their own user taxonomy table 12a.

When creating or manipulating the taxonomy, in certain embodiments a user may additionally designate branches of the taxonomy, e.g. categories, as being associated, such as by being either equivalent or related. One element or "branch" can be equivalent to and/or related to multiple other elements or "branches." The user can then use a single taxonomy table 12a but dynamically switch to an alternate presentation of the taxonomy encompassed in that taxonomy table 12a, such as by designating a category or branch as the temporary root of an alternate presentation of the taxonomy. By way of example and not limitation, a user may have categories as shown in Table 1 below for money:

TABLE 1

| LEVEL1 | LEVEL2 | LEVEL3 | LEVEL4 |
| --- | --- | --- | --- |
| US | | | |
| | currency | | |
| | | paper | |
| | | coin | |
| | | | Copper |
| | | | Silver |
| | | credits | |

TABLE 1-continued

| LEVEL1 | LEVEL2 | LEVEL3 | LEVEL4 |
|---|---|---|---|
| CANADA | | | |
| | currency | | |
| | | paper | |
| | | coin | |
| | | | Copper |
| | | | Silver |
| | | | Gold |

If the branch "US\currency" has been set to be equivalent to the branch "canada\curency," a dynamic alternate presentation may appear as shown in Table 2:

TABLE 2

| LEVEL1 | LEVEL2 | LEVEL3 | LEVEL4 |
|---|---|---|---|
| Currency | | | |
| | paper | | |
| | | | US + CANADA |
| | coin | | |
| | | Copper | |
| | | | US + CANADA |
| | | Silver | |
| | | | US + CANADA |
| | | Gold | |
| | | | CANADA |
| | credits | | |
| | | US | |

Alternatively, if the "US\currency\coin" branch is set to be equivalent to the "canada\currency\coin" branch, a further dynamic alternate presentation may appear as shown in Table 3:

TABLE 3

| LEVEL1 | LEVEL2 | LEVEL3 |
|---|---|---|
| coin | | |
| | Copper | |
| | | US + CANADA |
| | Silver | |
| | | US + CANADA |
| | Gold | |
| | | CANADA |

If the "US\currency\coin" branch is set as related to the "canada\currency\coin" branch, a further dynamic alternate presentation may appear as shown in Table 4:

TABLE 4

| LEVEL1 | LEVEL2 | LEVEL3 | LEVEL4 |
|---|---|---|---|
| coin | | | |
| | US | | |
| | | Copper | |
| | | | US |
| | | Silver | |
| | | | US |
| | CANADA | | |
| | | Copper | |
| | | | CANADA |
| | | Silver | |
| | | | CANADA |
| | | Gold | |
| | | | CANADA |

As a further illustrative example, the following taxonomy as shown in Table 5 may be created by a user:

TABLE 5

| LEVEL1 | LEVEL2 | LEVEL3 | LEVEL4 |
|---|---|---|---|
| engines | | | |
| | Manufacturer1 | | |
| | | gas | |
| | | | 4 |
| | | | 6 |
| | | | 8 |
| | | diesel | |
| | | | 8 |
| | Manufacturer2 | | |
| | | gas | |
| | | | 4 |
| | | | 6 |
| | | | 8 |
| | | | 10 |
| | | Diesel | |
| | | | 8 |

If the user designates "Manufacturer1\gas" as equivalent to "Manufacturer2\gas," a dynamic alternate presentation may appear as shown in Table 6:

TABLE 6

| LEVEL1 | LEVEL2 | LEVEL3 |
|---|---|---|
| Gas | | |
| | 4 | |
| | | Manufacturer1 + Manufacturer2 |
| | 6 | |
| | | Manufacturer1 + Manufacturer2 |
| | 8 | |
| | | Manufacturer1 + Manufacturer2 |
| | 10 | |
| | | Manufacturer2 |

Similarly, if the user designates "Manufacturer1\gas" as related to "Manufacturer2\gas," a dynamic alternate presentation may appear as shown in Table 7:

TABLE 7

| LEVEL1 | LEVEL2 | LEVEL3 |
|---|---|---|
| Gas | | |
| | 4 | |
| | | Manufacturer1 |
| | | Manufacturer2 |
| | 6 | |
| | | Manufacturer1 |
| | | Manufacturer2 |
| | 8 | |
| | | Manufacturer1 |
| | | Manufacturer2 |
| | 10 | |
| | | Manufacturer2 |

In all of these examples above, the initial taxonomy table 12a will not be altered by these alternative presentations. However, using these dynamic alternate presentations, the user can enter data and/or summaries in one category, e.g. "engines\manufacturer1\gas\4" and be able to search and retrieve information from that category when investigating a class of similar categories, e.g. 4 cylinder gasoline engines in general.

An exemplary embodiment for a legal environment will now be described. Users may create their taxonomy in the manner identified above. There is no predefined taxonomy required. Thus, a lawyer concerned with intellectual property may create a taxonomy that describes patent, trademark, anti-trust, trade secret, and copyright categories. A legal researcher concerned with real estate law may create a taxonomy that describes real property, personal property, government regulations, and contracts where contracts has further subcategory layers for sales and leases and government regulations has subcategories encompassing environmental law.

Case law, statutory law, contracts, opinions, regulations, and the like may be captured 810, such as through the Internet, into authority table 22a. Many of these files are available through court or other governmental sites and are in the public domain and other such documents may be available without copyright restriction. The user may additionally manually capture the relevant authority identifier 812, e.g. the volume/reporter/page/court/date information, or such information may be automatically or programmatically derived.

Once the raw data are captured and the description of the source of raw data obtained, these data may then be associatively stored in their respective tables 824, e.g. authority table 22a.

Once captured, the user may then retrieve the raw data 826 and create one or more summaries 830, if so desired, as described herein above. Because the categories are embodied in a user modifiable taxonomy table 12a, users are free to organize their summarization as they wish, in a manner and with a layout helpful to that specific user. Further, as the user portion 300 may be separate from the backend portion 200, users may freely create different user portions 300 without impacting other users' use of the backend portion 200 authority table 22a. If a taxonomy entry does not exist 832 that adequately categorizes the summary created by the user, according to the user's wishes, the user may create a new taxonomy entry 833. The user may then associate the summary with the desired taxonomy entry 834 and with the raw data from which the summary was derived 838.

Control to access of all or portions of database 22 or any of its functions including access to and manipulation of backend portion 200 or user portion 300 may be achieved by numerous methods as will be familiar to those of ordinary skill in the database and programming arts, by way of example and not limitation including password logins, cookies, and the like, or combinations thereof.

By way of further example and not limitation, the present inventions may be used in conjunction with other free or for-fee services, such as those available through the Internet 100, such as by being a front end to those other services. Acting as an intermediary, the present inventions allow users to contain and refine knowledge and references uncovered during prior searches and integrate new information into the user's captured knowledge and references. By way of example and not limitation, in this manner a user may continue to use services such as LEXIS/NEXIS™ offered by REID ELSEVIER, INC. or WESTLAW™ offered by THE THOMSON GROUP but not be required to utilize the taxonomies used by those services. Similarly, users may access search engines available through the Internet 100 such as YAHOO™ or GOOGLE™ which either have their own taxonomy or offer no taxonomy, and integrate information uncovered with those search into the user's captured knowledge and references.

Figure 9:
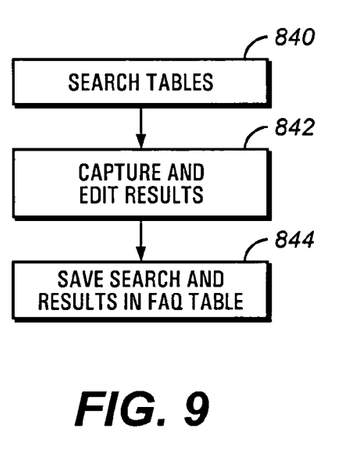

Referring now to FIG. 9, once created, users may freely search 840 either their own user portion 300 or authority table 22a or both using simple, word-oriented queries or any other query available to the user through database 22, by way of example and not limitation including latent semantic indexing. In a distributed environment, a user query could be communicated to server 30 executing a query handler, and results messaged back to the user query handler.

These searches may be retained such as by capturing relevant search results 842 and the retained results further edited 844 if desired.

It is expressly understood that although the exemplary embodiments above have been described in terms of multiple tables, whether free tables or database tables, numerous equivalent structures, table definitions, and database definitions exist which will be equivalent to the structure, table definitions, and database definitions above. It is also expressly understood that although the exemplary embodiments above have been described in terms of a legal search system, the present inventions are not limited to legal searches.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A system for organization of information, comprising:
   a. a server comprising a searchable authority table, the authority table further comprising a record, the record comprising a key field and a raw data field, the raw data field further comprising user selected contents of a user selected electronic file;
   b. a data communications device operatively in communication with the server;
   c. a user computer operatively in communication with the data communications device, the user computer providing user access to the searchable authority table, the user computer further comprising a data store comprising:
      i. at least one user definable taxonomy table, wherein the taxonomy table:
         (1) is accessible to the user computer;
         (2) comprises a record comprising at least one key field adapted to provide for relating the a record in the taxonomy table to at least one record in the authority table and a taxonomy field comprising user created taxonomy data; and
         (3) is manipulatable by a user with adequate access permission to manipulate records contained in the user taxonomy table; and
      ii. at least one searchable summary table, wherein the summary table:
         (1) is accessible to the user computer;
         (2) comprises a record comprising a first key field adapted to relate a record in the summary table to at least one record in either the authority table or the user taxonomy table and a summary field comprising user created data; and
         (3) is manageable by a user with adequate access permission to manage the summary table;
   d. software executable in the server to provide access to and management of the authority table by the user; and
   e. software executable in the user computer to provide access to and manipulation or the taxonomy table and the summary table by the user.

2. The system of claim 1 wherein manipulation of the taxonomy table comprises creating, modifying, associating elements in the taxonomy table with other elements in the taxonomy table for dynamic alternate presentation, rearranging, and deleting elements of the user taxonomy table.

3. The system of claim 1 wherein management of the summarization table comprises creating, modifying, and deleting elements of the summary table and associating elements of the summary table with at least one element of the user taxonomy table.

4. The system of claim 1 wherein the user computer has access to a plurality of searchable raw data via the data communications device.

5. The system of claim 1 wherein the contents of the raw data field of the authority table further comprise at least one of (i) text, (ii) graphics, (iii) audio, or (iv) video contained in at least one of (v) an electronic file document or (vi) a reference to an electronic file.

6. The system of claim 1 wherein the server further comprises a database comprising the authority table.

7. The system of claim 1 further comprising:
  a. a data network accessible to the server and the user computer via the data communications device; and
  b. query software executing at least partially in the server;
  c. whereby computers with access to the data network may be allowed to access predetermined portions of the authority table.

8. The system of claim 7 wherein the authority table record's raw data field comprises a reference to raw data located using the Internet.

9. The system of claim 7 wherein:
  a. the data network comprises the Internet;
  b. the user computer uses Internet browsing software executable at the user computer to access the predetermined portions of the database; and
  c. the server is an Internet service provider;
  d. wherein the user computer further has access to a plurality of searchable raw data via the Internet.

10. The system of claim 9, wherein the software executable in the user computer is further adapted to allow a user to submit a query to the query software via the Internet.

11. The system of claim 1 further comprising a user interface to the system comprising at least one of an HTML user interface, a non-database language user interface, and a database language interface.

12. A method of searching a system of claim 1 for relevant information, comprising:
  a. capturing raw data into a programmatically manipulatable format:
  b. at a user's initiation, storing the programmatically manipulatable formatted raw data into the raw data field of the record of the authority table;
  c. capturing a description of a source of the raw data;
  d. storing the description into authority table;
  e. associating the description with the data in the authority table;
  f. formulating by the user of a query at a user workstation;
  g. analyzing the query for keywords;
  h. obtaining user filtering input for tables to be searched from the user;
  i. searching for the keywords against the raw data field of the record of the authority table using the user filtering input; and
  j. returning search results to the user.

13. The method of claim 12, further comprising at least one of:
  a. allowing the user to continue the search outside the tables when the number of search results occurs below a predetermined threshold; and
  b. allowing the user to continue the search outside the tables on a user initiated command.

14. The method of claim 12, wherein the filtering input comprises at least one of limiting searches to a selected element of the taxonomy, limiting searches to a plurality of selected elements of the taxonomy, limiting searches to all elements of the taxonomy, limiting searches based on fields present for an authority table element, and limiting searches based on fields present for a summary table element.

15. The method of claim 12 wherein a user viewing a summary table element may be allowed to view the raw data from which that summary was derived, the allowing comprising at least one of selecting a region on a display at the user computer in which the summary is being displayed, selecting a command button on the display, and using one or more keys on a keyboard associated with the user computer.

16. A method of creating summarized information for later access for a system a server comprising a searchable authority table, the authority table further comprising a record, the record comprising a key field and raw data field, the raw data field further comprising user selected contents of a user selected electronic file; a data communications device operatively in communication with the server; a user computer operatively in communication with the data communications device, the user computer providing user access to the searchable authority table, the user computer further comprising a data store comprising at least one user definable taxonomy table, wherein the taxonomy table (1) is accessible to the user computer; (2) comprises a record comprising at least one key field adapted to provide for relating the record in the taxonomy table to at least one record in the authority table and a taxonomy field comprising user created taxonomy data; and (3) is manipulatable by a user with adequate access permission to manipulate records contained in the user taxonomy table; and at least one searchable summary table, wherein the summary table (1) is accessible to the user computer; (2)comprises a record comprising a first key field adapted to relate a record in the summary table to at least one record in either the authority table or the taxonomy table and a summary field comprising user created data; and (3) is manageable by a user with adequate access permission to manage the summary table; software executable in the server to provide access to and management of the authority table by the user; and software executable in the user computer to provide access to and manipulation of the taxonomy table and the summary table by the user; the method comprising:
  a. capturing raw data into a programmatically manipulatable format;
  b. at a user's initiation, storing the programmatically manipulatable format of the raw data into the raw data field of the record of the authority table;
  c. capturing a description of a source of the raw data;
  d. storing the description into the authority table while associating the description with the data in the authority table;
  e. allowing a user to programmatically retrieve the raw data contents from the raw data field of the record of the authority table;
  f. allowing the user to summarize at least a portion of the retrieved raw data;
  g. examining by the user for one or more elements in the user taxonomy table for a taxonomy table element to associate with the summarization;
  h. creating by the user of a new element in the user taxonomy table describing a taxonomy element to associate with the summarization if an appropriate element is not already present in the taxonomy table;

i. associating the summarization with the appropriate element of the taxonomy table using a key field in the user taxonomy table and the summary table;

j. associating the summarization with the authority table using a key field in the authority table and the summary table; and k. storing the summarization and associations in the summary table.

17. The method of claim 16 wherein step (a) further comprises:

i. parsing the raw data prior to storing the captured raw data in the raw data field of the record of the authority table to create parsed raw data;

ii. generating keywords from the parsed raw data;

iii. saving the keywords in a keyword table associated with the authority table; and iv. storing the raw data description in a description field of the record of the authority table.

18. The method of claim 16 wherein step (k) further comprises:

i. parsing the summarization prior to storing the summarization in the summary table;

ii. generating keywords from the parsed summarization;

iii. saving the keywords in a keyword table associated with the summary table; and iv. storing the summarization in the summary table.

19. The method of claim 16 wherein the description of the raw data comprises at least one of the raw data, a pointer to the raw data, a description of a file containing the raw data, and a description of a remote source location of a file containing the raw data.

20. The method of claim 16 further comprising:

a. receiving a notice of addition of new raw data to the authority table at the user computer;

b. receiving keywords associated with the new raw data at the user computer;

c. processing the user taxonomy table for keywords associated with one or more predetermined elements of the user taxonomy table for keywords associated with each of those predetermined elements of the user taxonomy table;

d. examining the keywords associated with each of the predetermined elements of the user taxonomy table against the keywords received associated with the new raw data;

e. generating a relevance factor for the new raw data based on the examination; and f. suggesting the new raw data to the user as relevant for each of the predetermined elements of the user taxonomy table where the relevance factor is at a predetermined threshold level in each of the predetermined elements of the user taxonomy table.

* * * * *